United States Patent
Yoshida et al.

[19]

[11] Patent Number: 6,158,046
[45] Date of Patent: Dec. 5, 2000

[54] COMPUTER DEVICE AND METHOD FOR PROCESSING DATA UTILIZING PSEUDOINSTRUCTION WORDS

[75] Inventors: Yukihiro Yoshida, Ikoma; Kunihiro Katayama; Noboru Kubo, both of Yamatokoriyama, all of Japan

[73] Assignee: Sharp Kabushiki Kaisha, Osaka, Japan

[21] Appl. No.: 08/803,637

[22] Filed: Feb. 21, 1997

[30] Foreign Application Priority Data

Feb. 22, 1996 [JP] Japan .................................... 8-035293

[51] Int. Cl.[7] .................................................. G06F 9/45
[52] U.S. Cl. ............................................................ 717/5
[58] Field of Search .................................. 395/701, 683, 395/567, 384, 395, 708, 588, 569, 568, 561, 705, 704, 707; 345/523; 717/5, 7, 9

[56] References Cited

U.S. PATENT DOCUMENTS

| | | | |
|---|---|---|---|
| 4,337,458 | 6/1982 | Cohn et al. | 341/55 |
| 4,791,558 | 12/1988 | Chaitin et al. | 395/705 |
| 4,866,608 | 9/1989 | Tanagawa | 711/167 |
| 5,287,305 | 2/1994 | Yoshida | 365/189.01 |
| 5,335,330 | 8/1994 | Inoue | 395/588 |
| 5,398,327 | 3/1995 | Yoshida | 395/500 |
| 5,423,012 | 6/1995 | Sato et al. | 395/380 |
| 5,442,762 | 8/1995 | Kato et al. | 395/384 |
| 5,487,158 | 1/1996 | Amelina et al. | 395/705 |
| 5,490,256 | 2/1996 | Mooney et al. | 712/227 |
| 5,628,017 | 5/1997 | Kimmerly et al. | 395/704 |
| 5,634,136 | 5/1997 | Ohshima et al. | 395/584 |
| 5,652,889 | 7/1997 | Sites | 395/708 |
| 5,708,800 | 1/1998 | Tateishi et al. | 345/523 |
| 5,734,855 | 3/1998 | Sato et al. | 395/395 |
| 5,768,575 | 6/1998 | McFarland et al. | 395/569 |

FOREIGN PATENT DOCUMENTS 6168140  6/1994  Japan .

*Primary Examiner*—Tod R. Swann
*Assistant Examiner*—Matthew Smithers

[57] ABSTRACT

A computer device includes a processor for processing an object code containing a plurality of instruction words. It further includes a memory for storing a plurality of pseudo-instruction words respectively corresponding to the plurality of instruction words. Preferably, the number of bits of each of the plurality of pseudoinstruction words is less than that of each of the plurality of instruction words. Finally, the computer device includes an instruction word converter for converting the pseudoinstruction word read out from the memory into an instruction word of the object code, and for outputting the instruction word obtained by the conversion to the processor.

22 Claims, 9 Drawing Sheets

COMPUTER DEVICE AND METHOD FOR PROCESSING DATA UTILIZING PSEUDOINSTRUCTION WORDS

BACKGROUND OF THE INVENTION

1. Field of the Invention

The present invention relates to a computer device and method capable of reducing a memory capacity of a read-only memory (ROM) for storing a program therein.

2. Description of the Related Art

Figure 10:
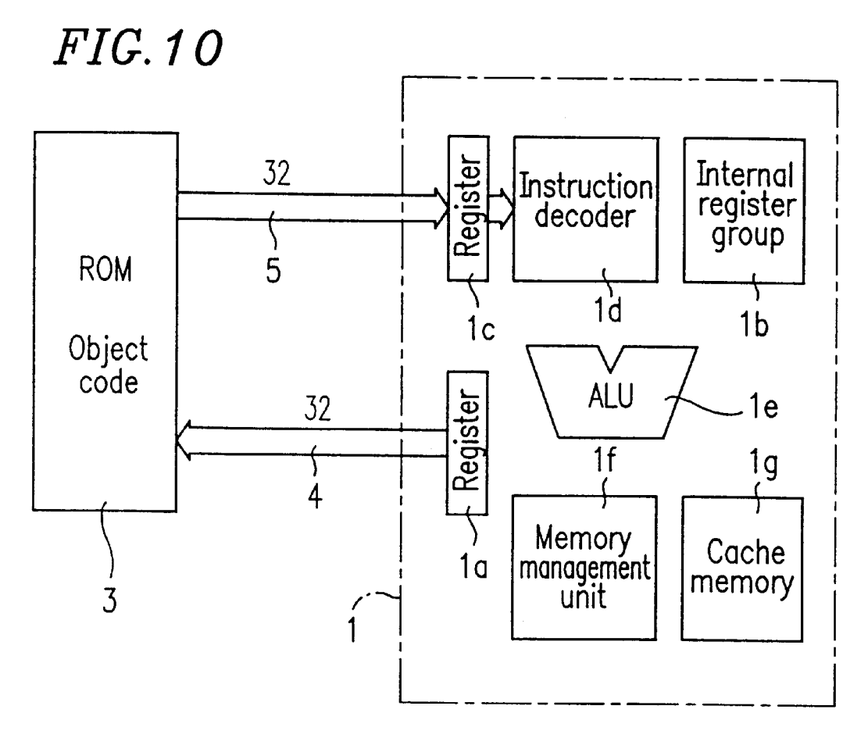
FIG. 10 is a block diagram showing the configuration of a conventional computer device.

FIG. 10 shows a conventional example of a configuration of a computer device for executing a program stored in a ROM with a 32-bit microprocessor. The ROM 3 stores an object code containing a large number of instruction words. The term "object code" herein indicates an executable form program, not a relocatable form program. Moreover, the object code includes not only a program but also normal data in some cases. The term "instruction word" herein merely refers to a code. The code is obtained by dividing the object code so as to have an arbitrary length. The instruction word includes not only an instruction code for executing a command, but can include a code of an address which is possibly appendant to the instruction code, such as a code of an address or a code of immediate data and various data codes within the object code.

A microprocessor 1 transmits an address via an address bus 4 from an address register 1a to read the instruction word stored at an address of the ROM 3. The address bus 4 is a 32-bit address bus, via which a 32-bit address is transmitted. However, it is not necessary that the ROM 3 should have an address space of 32 bits ($2^{32}$) In the case where the instruction word to be read out is an instruction code for executing a command, the address transmitted from the address register 1a is an effective address. The effective address may be generated by a program counter. The program counter is located in an internal register group 1b. In the case where the instruction word to be read out is data or the like, the address transmitted from the address register 1a is an effective address obtained by converting the address stored in one of the registers other than the program counter in the internal register group 1b as needed.

The instruction word read from the ROM 3 by transmission of the address is read in the microprocessor 1 via the data bus 5, and then is temporarily held in the data register 1c. In the case where the instruction word is an instruction code, the instruction word is transmitted to an instruction decoder 1d and is decoded therein. Then, in accordance with the result of decoding, a control section (not shown) executes an operation command designated by the instruction word. For example, in the case where the instruction word designates an operation process between the registers, the data in the specified register within the internal register group 1b is processed in an arithmetic and/or logic unit (hereinafter, referred to as ALU) 1e. Then, the result of the arithmetic and/or logic process is stored in the specified register within the internal register group 1b. In the case where the instruction word is not an instruction code, the instruction word is transmitted from the data register 1c to a register within the internal register group 1b or the ALU 1e. The address register 1a, the internal register group 1b, the data register 1c and the ALU 1e are connected to each other via internal buses (not shown).

The microprocessor 1 includes a memory management unit 1f and a cache memory 1g. The memory management unit 1f converts a logic address into a physical address, and supports an exceptional process in memory protection or virtual memory of an operating system (OS). Therefore, in actuality, the address transmitted from the address register 1a is a physical address converted by the memory management unit 1f. The cache memory 1g is a semiconductor memory device operating faster than the ROM 3. The cache memory 1g collectively reads out the instruction words from the ROM 3, and successively supplies the instruction words to the microprocessor 1 in accordance with the addressing. Therefore, in actuality, the instruction words read out from the ROM 3 are transmitted to the cache memory 1g via the data bus 5, and then are supplied to the data register 1c therefrom. The microprocessor 1 does not need to perform a low-speed read-out from the ROM 3 as long as the specified address is hit in the cache memory 1g. However, hit rate is lowered if a branch instruction or the like is frequently used. In such a case, even when the cache memory is provided, the reading of the instruction word becomes complicated. Thus, even when the cache memory is provided, the program is not always executed at high speed.

In an actual computer device, even if the whole program is stored in the ROM 3, a random access memory (RAM) (not shown) serving as a work area upon execution of the program and an I/O port (not shown) for input/output of an input device or a display device are connected to each other via the address bus 4 and/or the data bus 5. The RAM and the I/O port perform the same reading and writing processes as in the ROM 3.

Since program sizes have increased to enable recent computer devices to have enhanced functions, these recent computer devices now require memory devices having large capacity. However, in a computer device, in particular, in a portable computer device, a mount area for IC or the like is limited due to the reduced size of the computer device. Furthermore, since power consumption and fabrication cost are desired to be lowered, it is not possible to infinitely increase the memory capacity of the portable computer device. As a result, the size of an application program is limited, so that the function and performance of the computer device are adversely forced to be lowered. If the optimization is performed when a compiler compiles a program, the size of an object code can be reduced. The optimization with the compiler is mainly performed for omitting unnecessary code generated by programming with a high-level language so that the program approaches a program which is optimally programmed in an assembler. However, the degree reduction in size obtainable by this optimization is limited.

In order to overcome the above disadvantages, a technique employing data compression is conventionally utilized. According to this technique, the capacity of the memory can be reduced by decreasing the size of the object code of the program or the data stored in an external memory device such as a hard disk device, or the data size stored in a main memory device.

In the case where the program or the data stored in the external memory device is subjected to data compression, the data is expanded upon loading into the main memory device. Therefore, although the capacity of the external memory device can be reduced, the memory capacity of the main memory device cannot be reduced. In the case where the compressed data is stored in the main memory device, the data to be stored therein is limited to specific data which is internally utilized by an application program. Moreover, the application program itself is not data compressed on the main memory device because a general data compression method is the combination of a run length method and a Huffman method: the run length method converts the successive same instruction words into the combination of a code representing any one of the instruction words and a code representing a length of the successive instruction words; and the Huffman method converts each instruction word into a variable length code in accordance with its occurrence frequency. Therefore, the data compression is required to be performed in a sequential manner from the head of the object code or the head of the block. Thus, in the case where the whole object code is loaded into the main memory device, it is possible to perform data expansion in a sequential manner. Moreover, with respect to the data utilized within the application program, it may be also possible to perform data compression in a sequential manner in some cases.

However, in the case where the data-compressed object code is stored in the main memory device without performing any processing, instruction words cannot be accessed one by one in a random manner since the relative positional relationship between the compressed instruction words on the address is disordered.

Japanese Laid-Open Patent Publication No. 6-168140 discloses an optimizing method of a compiler. According to this method, the size of an object code is intended to be reduced by changing an instruction scheme of a 32-bit fixed length for a reduced instruction set computer (RISC) type microprocessor into an instruction scheme of a 16-bit fixed length. Simultaneously, the object code with high efficiency using the 16-bit fixed length instruction system is intended to be reduced.

According to the method, however, the bit size itself of the instruction word is the simplified instruction scheme of RISC or the like. The computer device according to the method is substantially the same as other conventional computer devices in that each of the instruction words is read from the object code on the main memory device in the microprocessor 1 and is then decoded to be executed. Thus, the size of the actually used object code is not appropriately reduced thereby.

Furthermore, although a processing rate of the microprocessor 1 is remarkably improved, a latency upon reading of the instruction words is increased in the case where the operation rate of the main memory device or the bus cycle remain unimproved. Thus, there arises a problem that the microprocessor 1 cannot sufficiently demonstrate its performance. In order to increase the operation rate of the main memory device, an expensive memory device should be used. Even if the operation rate is increased by employing such a memory device, a switching rate of a three-status buffer connected to the data bus 5 or the like is increased. As a result, the power consumption is disadvantageously increased thereby.

SUMMARY OF THE INVENTION

The computer device of this invention includes: a processor for processing an object code having a plurality of instruction words; a memory for storing a plurality of pseudoinstruction words respectively corresponding to the plurality of instruction words, the number of bits of each of the plurality of pseudoinstruction words being less than that of each of the plurality of instruction words; and an instruction word converter for converting the pseudoinstruction word read out from the memory into an instruction word of the object code and for outputting the instruction word obtained by the conversion to the processor.

According to another aspect of the invention, the computer device includes: a processor for processing an object code containing a plurality of instruction words; and a memory for storing a plurality of pseudoinstruction words in units of $2^i$ words, the plurality of pseudoinstruction words respectively corresponding to the plurality of instruction words, the number of bits of each of the plurality of pseudoinstruction words being less than that of each of the plurality of instruction words. Also included in this aspect of the invention, an instruction word converter for converting the pseudoinstruction word read out from the memory into an instruction word of the object code and for outputting the instruction word obtained by the conversion to the processor, wherein the processor outputs an address of q bits to the instruction word converter. The instruction word converter separates the address of n bits into an address of n-i bits and an address of i bits, the memory outputs the $2^i$ pseudoinstruction words stored as the pair corresponding to the address of n-i bits. The instruction word converter selects one pseudoinstruction word from the $2^i$ pseudoinstruction words in accordance with the address of i bits, the processor processes the selected pseudoinstruction word, and i and n are respectively integers equal to or larger than 1, and satisfy a conditional expression n>i.

Thus, the invention described herein makes it possible to obtain the advantage of providing a computer device which is capable of reducing a memory capacity and increasing an operation rate, or reducing the power consumption by appropriately reducing the number of bits of each of a plurality of instruction words contained in an object code and then storing the instruction word having a reduced number of bits in a main memory device.

This and other advantages of the present invention will become apparent to those skilled in the art upon reading and understanding the following detailed description with reference to the accompanying figures.

DESCRIPTION OF THE PREFERRED EMBODIMENTS

Herein after, the present invention will be described by way of illustrative examples.

Example 1

Example 1 of the present invention will be described below with reference to FIGS. 1 to 6.

Figure 1:
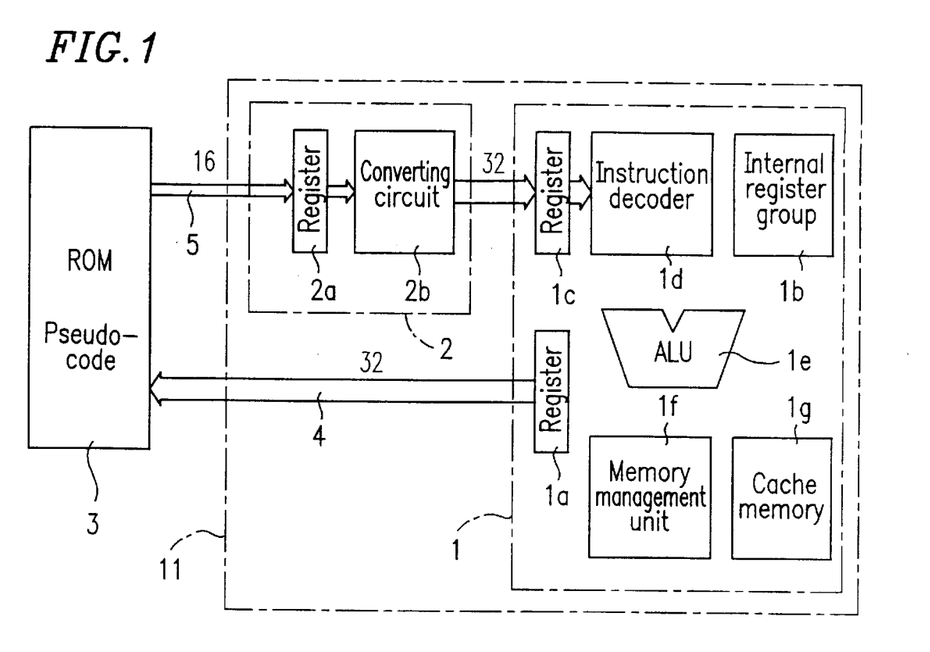
FIG. 1 is a block diagram showing the configuration of a computer device of Example 1 according to the present invention.

FIG. 1 shows a computer device of Example 1. The components having the same functions as those in FIG. 10 are denoted by the same reference numerals.

The computer device of FIG. 1 includes a central processing unit (CPU) and a ROM 3. As the CPU, a 32-bit microprocessor 11 is used. The ROM 3 stores a program therein.

The number of bits of each of the instruction words is defined as 32 bits, which is the same as a word length of the microprocessor. Since the instruction word is merely a unit of an appropriate number of bits, the number of bits of the instruction word may differ from the word length of the microprocessor 11. Therefore, the number of bits of each of the instruction words is not limited to 32 bits, but can be any number of bits.

If the number of bits of each of the instruction words exceeds the word length of the microprocessor 11, two or more accesses are needed to read one instruction word. Therefore, a process may be complicated thereby.

In Example 1, it is defined that the number of bits of the address bus 4 is 32 and the ROM 3 has an address space of $2^{32}$. The ROM 3 stores a pseudocode containing pseudoinstruction words. Although the pseudoinstruction word will be described in detail below, generally one pseudoinstruction word consists of 16 bits which is the same number of bits as the data bus 5. It is assumed that the ROM 3 reads out pseudoinstruction words one by one (i.e., 16 bits at a time). It is defined that only the 16-bit data bus 5 is used herein.

In the case where the present invention is carried out, it is apparent that these bit numbers and/or an address space of the ROM 3 can have values other than the values described above. However, the number of bits of one pseudoinstruction word should be less than at least that of one instruction word. In addition to a mask ROM, an overwritable ROM such as an electrically erasable programmable ROM (EEPROM) can also be utilized as the ROM 3.

The microprocessor 11 has a main processor 1 and an instruction word converter 2. The main processor 1 and the instruction word converter 2 may be integrally formed to be an LSI (large scale integrated) circuit on a single chip.

The main processor 1 has the same configuration as that of the microprocessor 1 shown in FIG. 10.

The instruction word converter 2 has an input register 2a and a converting circuit 2b. The instruction word converter 2 inputs a pseudoinstruction word of 16 bits transmitted via the data bus 5 to the converting circuit 2b via the input register 2a.

The converting circuit 2b converts the input 16-bit pseudoinstruction word into a 32-bit instruction word again. The converted instruction word is transmitted to a data register 1c of the main processor 1. The instruction word convertor 2 may be provided outside the microprocessor 11 so as to be coupled between the data bus 5 and the microprocessor 11.

Each of the instruction words of an object code uniquely corresponds to any one of the pseudoinstructions of the pseudocodes.

Since each of the instruction words of the object code consists of 32 bits, it is possible that a maximum of $2^{32}$ kinds (4,294,967,296 kinds) of the instruction words can be present. However, the object code, which can be stored in the ROM 3 having an address space of $2^{32}$, contains a maximum of $2^{32}$ words. Some instruction words in the object code normally overlap each other. Therefore, the number of kinds of actually used instruction words within the object code is significantly smaller than $2^{32}$. Furthermore, as the number of words in the object code is reduced, the number of kinds of actually used instruction words within the object code is further reduced.

In the case where M kinds of instruction words are actually used within the object code, n is determined as the number of bits of one pseudoinstruction word when $2^n$ (n is an integer equal to or larger than 1) becomes the minimum at M or larger. In this case, each of M kinds of instruction words which are actually used within the object code corresponds to at least one of $2^n$ kinds or less of pseudoinstruction words.

The case where the number (M) of kinds of instruction words actually used within the object code is: $2^{15} < M \leq 2^{16}$ (32,768 < M ≤ 65,536) will be described below. By setting the number of bits of each of the pseudoinstruction words at 16 (n=16), each of the instruction words actually used within the object code can be associated with at least one pseudo-instruction word.

Figure 2:
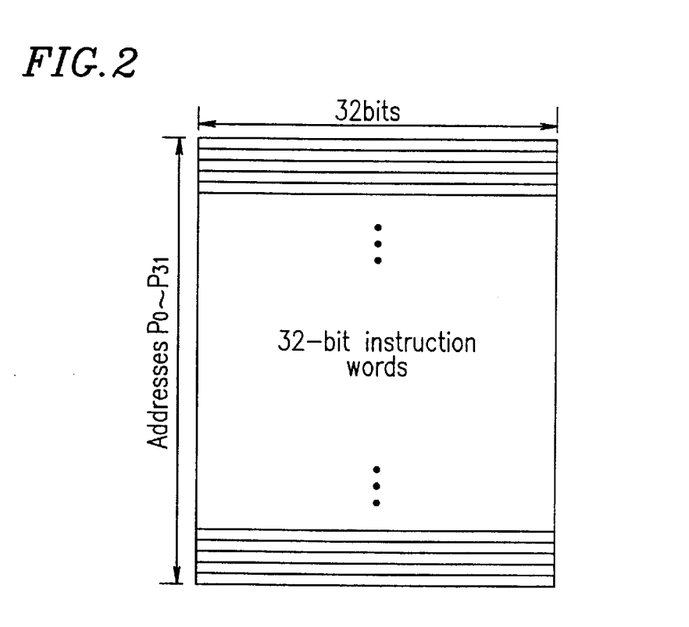
FIG. 2 is a view showing an original configuration of a ROM of Example 1 according to the present invention.
Figure 3:
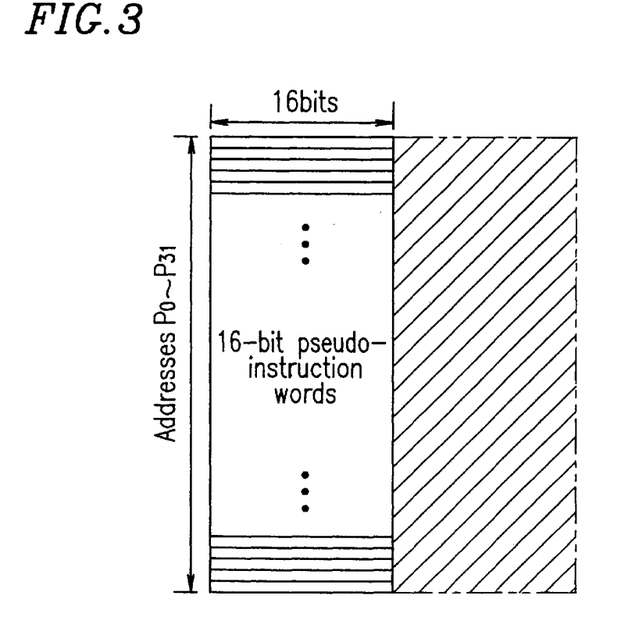
FIG. 3 is a view showing a configuration of a ROM of Example 1 according to the present invention in the case where pseudoinstruction word consists of 16 bits.

In the case where the object code is stored in the ROM 3 without performing any process, a 32-bit memory area is required for storing one instruction word for each of $2^{32}$ addresses which are specified by 32-bit addresses $P_0$ to $P_{31}$ as shown in FIG. 2. However, in the case where a pseudocode containing 16-bit pseudoinstruction words instead of 32-bit pseudoinstruction words is stored in the ROM 3, a 16-bit memory area for storing one pseudoinstruction word for each address is sufficient as shown in FIG. 3.

In this case, it is possible to halve a memory capacity of the ROM 3 (=16/32). For example, in the case where the object code is stored in the ROM 3 without performing any process, it is necessary to provide 32 memory devices. However, in the case where a pseudocode containing 16-bit pseudoinstruction words instead of 32-bit pseudoinstruction words is stored, it is sufficient to provide 16 memory devices. In Example 1, a memory device including 32-bit addresses and outputting one-bit data is employed.

Figure 4:
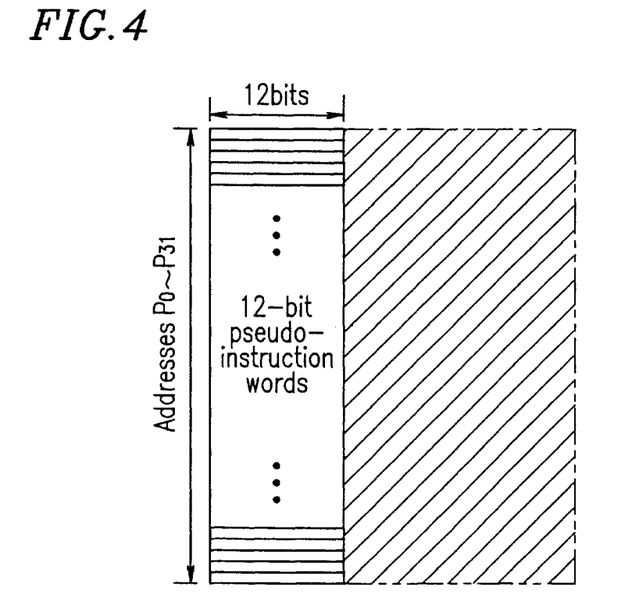
FIG. 4 is a view showing a configuration of a ROM of Example 1 according to the present invention in the case where pseudoinstruction word consists of 12 bits.

Furthermore, in the case where the number (M) of kinds of instruction words actually used within the object code falls within the range of: $2^{11} < M \leq 2^{12}$, it is possible to reduce the number of bits of one pseudoinstruction word to 12 (n=12). In such a case, it is sufficient that the ROM 3 has a 12-bit memory area for storing pseudoinstruction words one by one for each address as shown in FIG. 4. Therefore, a memory capacity of the ROM 3 can be reduced to be 3/8 (=12/32).

A method for generating a pseudocode will be described with reference to FIGS. 11 and 12.

Figure 11:
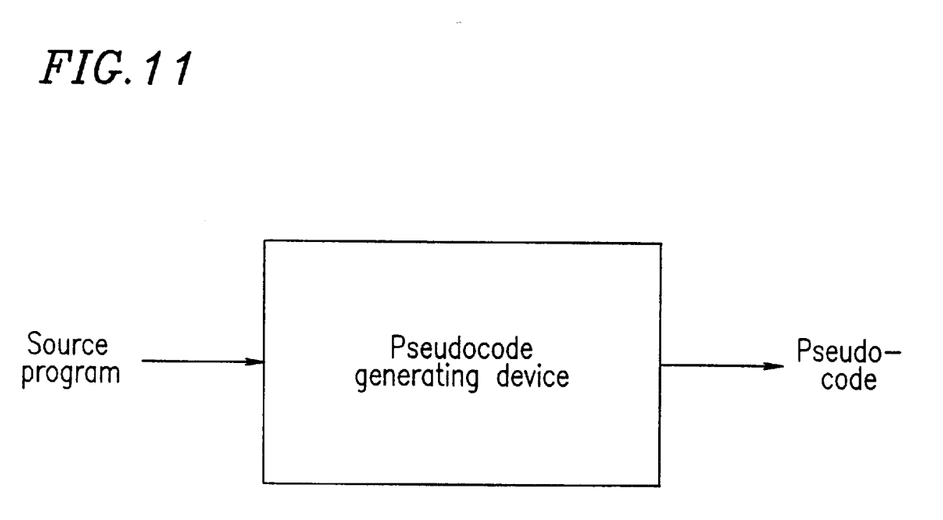
FIG. 11 is a view showing a pseudocode generating device.

FIG. 11 shows a pseudocode generating device. The pseudocode generating device converts a source program into a pseudocode. The pseudocode generating device may be a general computer device.

Figure 12:
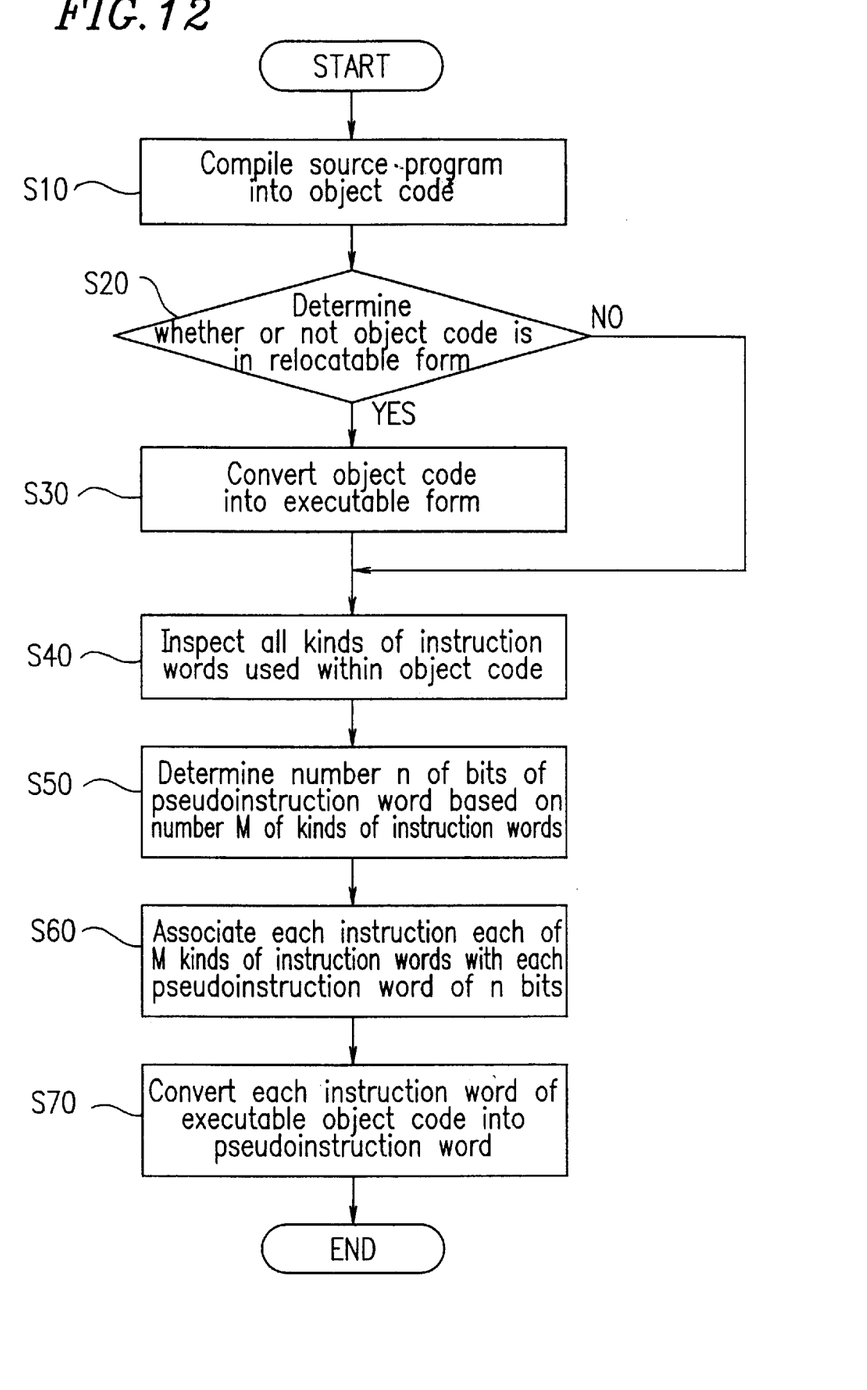
FIG. 12 is a flow chart showing a procedure of a generation process of a pseudocode executed in the pseudocode generating device shown in FIG. 11.

FIG. 12 is a flow chart showing the procedure of a process for generating a pseudocode executed in the pseudocode generating device shown in FIG. 11.

At Step S10, the pseudocode generating device compiles a source program which is generated so as to be executed in the computer device of Example 1 into an object code. In other words, the source program is converted into the object code.

At Step S20, the pseudocode generating device determines whether or not the compiled object code is in a relocatable form. In the case where the compiled object code is in a relocatable form, the process proceeds to Step S30. In the case where the compiled object code is not in a relocatable form, the process proceeds to Step S40. The case where the compiled object code is not in a relocatable form herein means that the object code is in an executable form.

At Step S30, the pseudocode generating device converts the compiled object code into an executable form as the object code to be stored in the ROM 3.

At Step S40, the pseudocode generating device examines all of the instruction words used within the object code. As a result, the number M of kinds of all instruction words used within the object code is found.

At Step S50, the pseudocode generating device determines the number n of bits of a pseudoinstruction word based on the number M of kinds of instruction words. For example, the number n of bits satisfying the conditional expression: $2^{n-1} < M \leq 2^n$ is obtained, wherein n is a positive integer.

At Step S60, the pseudocode generating device corresponds each of M kinds of instruction words to each of the n-bit pseudoinstruction words. For example, a correspondence table, in which each of M kinds of instruction words is associated with each of the n-bit pseudoinstruction words, may be generated.

At Step S70, the pseudocode generating device converts each of the instruction words of the object code in the executable form into a pseudoinstruction word based on the correspondence obtained at Step S60.

The pseudoinstruction words obtained by conversion are stored in the ROM 3. The pseudoinstruction words obtained by conversion may be stored in a recording medium such as a magnetic recording medium or an optical recording medium.

The order of execution of pseudoinstruction words obtained by conversion is the same as that of execution of original object codes.

The number n of bits of the pseudoinstruction words is not always required to be the minimum as long as $2^n$ is M or larger. In the case where the number n of bits is not the minimum or, in the case where the number n of bits is the minimum and there remains a large number of pseudoinstruction words which are not required to be associated with the instruction words, each of the remaining pseudoinstruction words can be associated with another instruction word, so that the same correspondence table can be utilized for another specific object codes.

Hereinafter, the configuration and the operation of the converting circuit 2b of the instruction word converter 2 will be described with reference to FIGS. 5 and 6.

Figure 5:
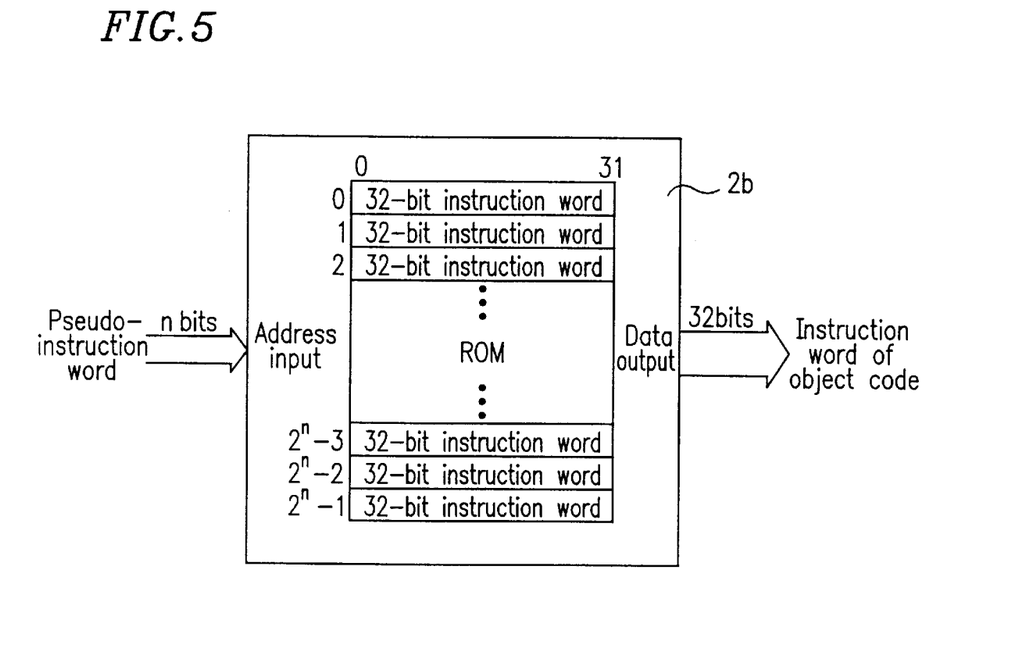
FIG. 5 is a block diagram showing the configuration of a converting circuit of Example 1 according to the present invention.

FIG. 5 shows an example of the converting circuit 2b of the instruction word converter 2.

The converting circuit 2b of the instruction word converter 2 has an address space of n bits (in the case of FIG. 1, 16 bits) as shown in FIG. 5. The converting circuit 2b is capable of storing a 32-bit instruction word in a memory area corresponding to each address. The converting circuit 2b may be constituted by a ROM.

The converting circuit 2b stores a conversion table showing the correspondence between the pseudoinstruction words and the instruction words. The conversion table represents the reversed relationship between input data and output data of the above-mentioned correspondence table in which the instruction words and the pseudoinstruction words are associated with each other.

In the 32-bit memory area of the converting circuit 2b, each corresponding instruction word is stored. For example, in the case where an address corresponding to each n-bit pseudoinstruction word is input, each corresponding instruction word is output.

The main processor 1 outputs a 32-bit address to the ROM 3, a 16-bit pseudoinstruction word read out from the ROM 3 is input to the converting circuit 2b via the input register 2a. The 16-bit pseudoinstruction word is used as an address for the converting circuit 2b. Based on the address, a 32-bit instruction word read out from the ROM of the converting circuit 2b is transmitted to the data register 1c of the main processor 1.

Figure 6:
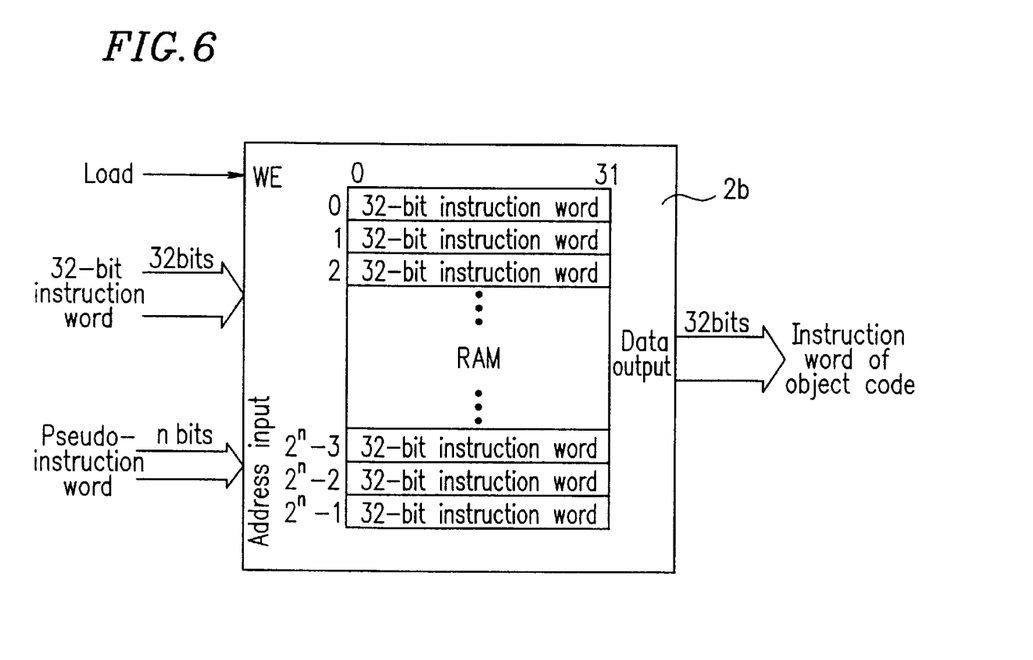
FIG. 6 is a block diagram showing another configuration of a converting circuit of Example 1 according to the present invention.

FIG. 6 shows another example of the converting circuit 2b of the instruction word converter 2.

The converting circuit 2b has an address space of n bits as shown in FIG. 6. The converting circuit 2b is capable of storing a 32-bit instruction word for each address. The converting circuit 2b may be constituted by a RAM.

The RAM goes into a writable state in the case where a load signal is active. By successively inputting an address corresponding to each pseudoinstruction word and a 32-bit instruction word corresponding to the address, it is possible to store the same conversion table as that in the ROM in the RAM as described above.

In the case where the load signal is inactive, the RAM performs the same operation as that of the ROM shown in FIG. 5 described above. If a writing operation is performed again, it is possible to change the contents of the conversion table. Therefore, the converting circuit 2b using the RAM is convenient when used in the case where the object code may be changed due to replacement of the ROM 3 and the overwrite of the contents stored in the ROM 3 constituted by an EEPROM.

Furthermore, instead of using the conversion table using the ROM or the RAM, the converting circuit 2b can be constituted by using a normal logic circuit or a programmable logic array (PLA).

As described above, the computer device of Example 1 can halve a memory capacity of the ROM 3 in the case where the number of bits of the pseudoinstruction word is defined as 16. The computer device of Example 1 can reduce a memory capacity of the ROM 3 to ⅜ in the case where the number of bits of the pseudoinstruction word is defined as 12. Moreover, for the main processor 1, the ROM 3 can be regarded as storing a 32-bit instruction word for each 32-bit address. Therefore, the main processor 1 having the same configuration as that of the conventional microprocessor 1 shown in FIG. 10 can be employed.

Example 2

Figure 7:
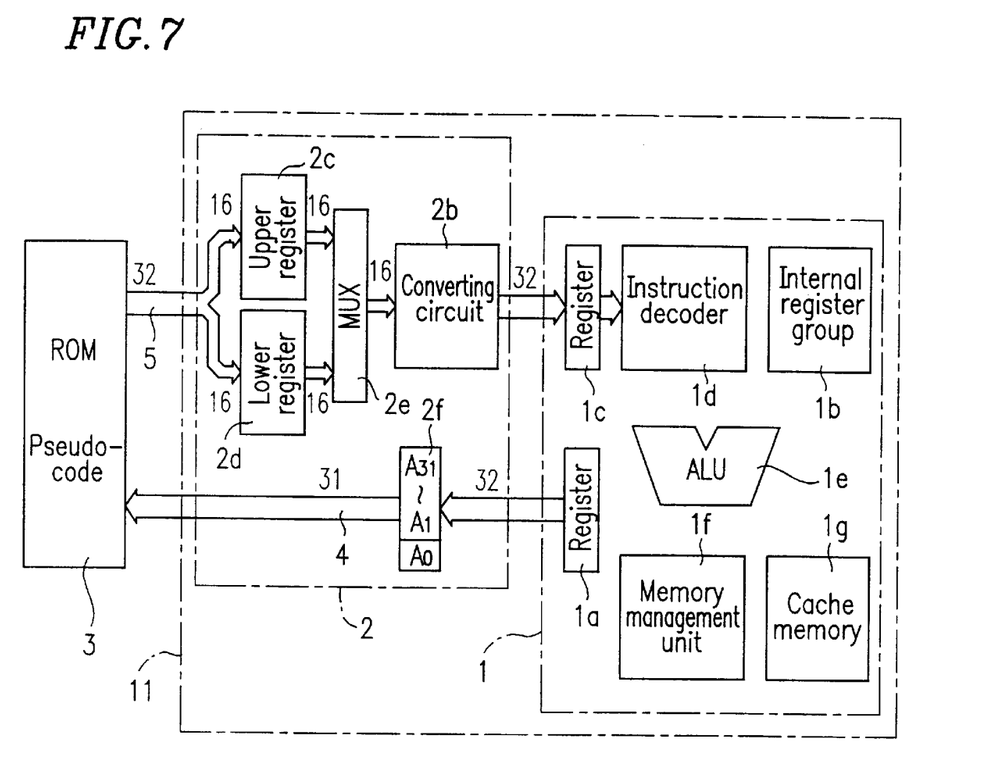
FIG. 7 is a block diagram showing the configuration of a computer device of Example 2 according to the present invention.
Figure 8:
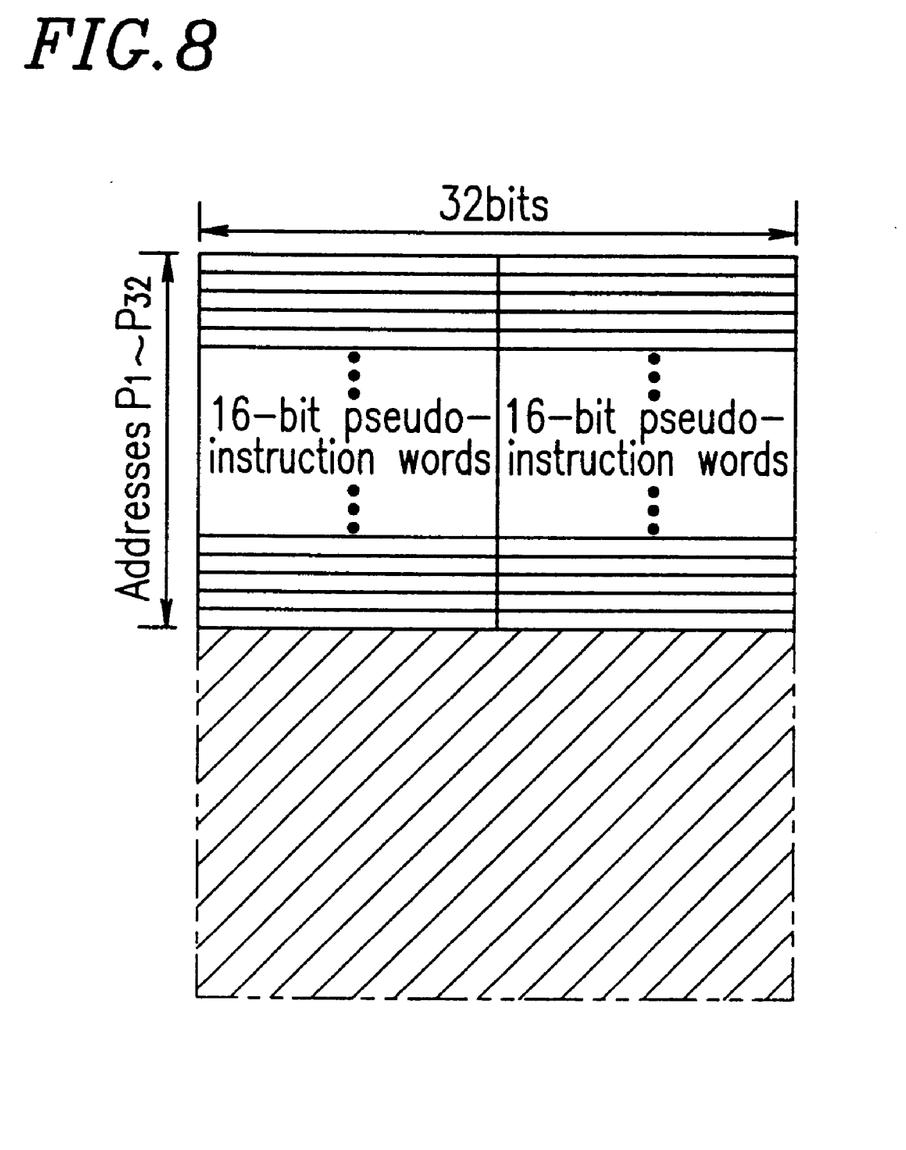
FIG. 8 is a view showing the configuration of a ROM of Example 2 according to the present invention.
Figure 9:
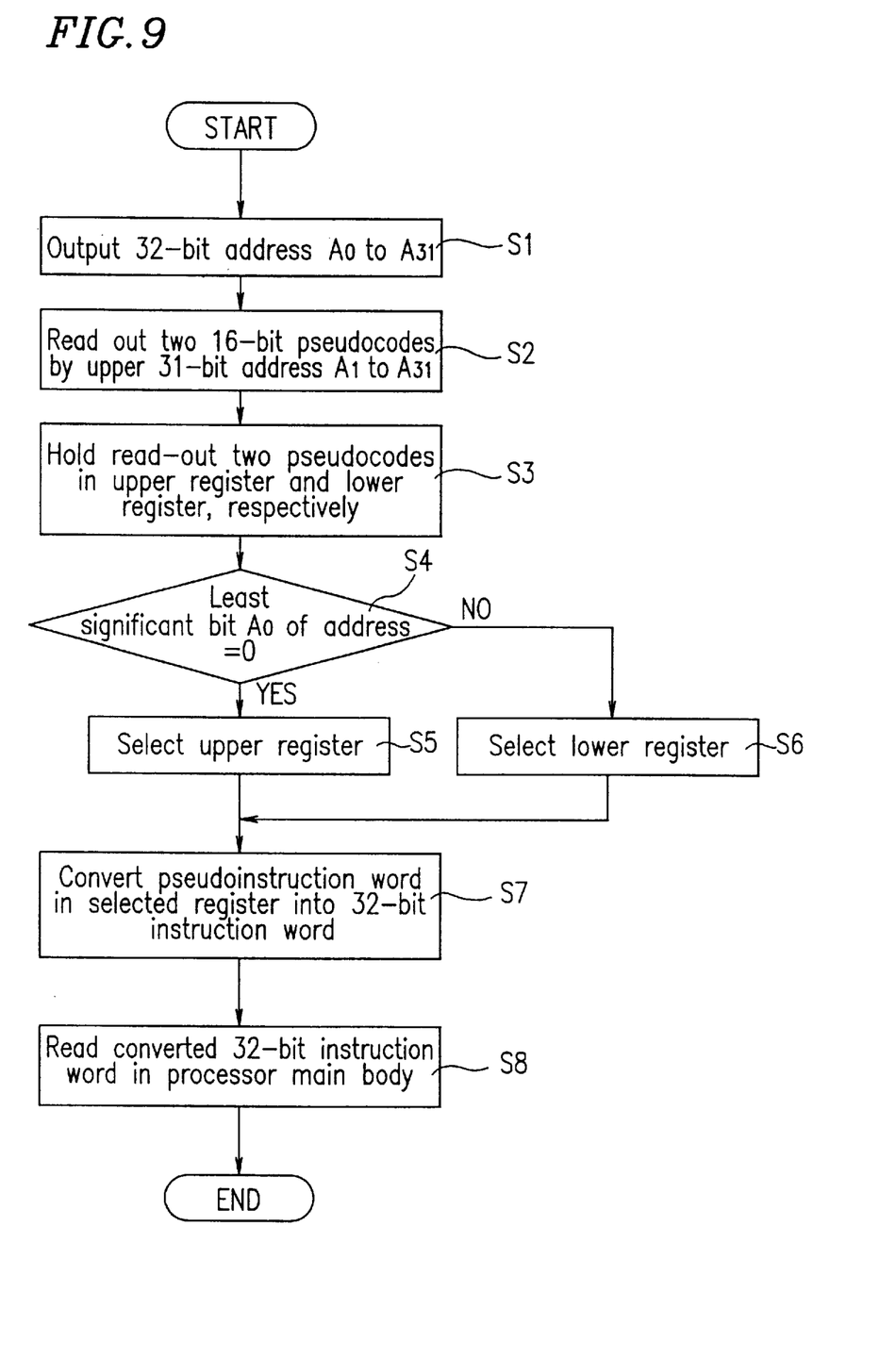
FIG. 9 is a flow chart illustrating an operation of one-word reading operation of the computer device of Example 2 according to the present invention.

FIGS. 7 to 9 show Example 2 of the present invention. FIG. 7 is a block diagram showing the configuration of a computer device, FIG. 8 is a view showing the configuration of a ROM, and FIG. 9 is a flow chart showing a one-word reading operation of the computer device. The components having the same functions as shown in FIGS. 1 to 4 in Example 1 are denoted by the same reference numerals.

The computer device of Example 2 differs from that of Example 1 in the configuration of the instruction word converter 2 as shown in FIG. 7. In addition, the number of bits of the address bus 4 is 31. As shown in FIG. 8, an address space of the ROM 3 has the size of $2^{31}$. Simultaneously, a memory area corresponding to each address of the ROM 3 is of 32 bits. In the ROM 3, the pseudocode consisting of 16-bit pseudoinstruction words shown in Example 1 is stored.

However, in the 32-bit memory area for each address, a pair of 16-bit pseudoinstruction words are stored. Therefore, the ROM 3 requires the size of 32 bits, which is the same as in the case where the memory area corresponding to each address stores an original instruction word having 32-bits. However, since the address space is halved to $2^{31}$, the memory capacity can be reduced by such a degree. In order to transmit a pair of pseudoinstruction words read out from the ROM 3, the data bus 5 also has a bit length of 32 bits.

In addition to the converting circuit 2b, the instruction word converter 2 includes an upper register 2c, a lower register 2d, and a multiplexer 2e. Each of the upper register 2c and the lower register 2d is a 16-bit register. The upper 16 bits in the data bus 5 are input to the upper register 2c, and the lower 16 bits in the data bus 5 are input to the lower register 2d. The multiplexer 2e serves as a data selector for selecting a 16-bit pseudoinstruction word held in either the upper register 2c or the lower register 2d so as to transmit the selected 16-bit pseudoinstruction word to the converting circuit 2b. The converting circuit 2b may have the same configuration as that described in Example 1.

The instruction word converter 2 has a 32-bit address separation register 2f between the address register 1a of the main processor 1 and the address bus 4 in an interpolated manner. The address separation register 2f holds each of the bits A0 to A31 of the address A output from the address register 1a, and transmits an upper address UA consisting of the upper 31 bits A1 to A31 to the 31-bit address bus 4 and the least significant bit A0 to a control terminal of the multiplexer 2e. Therefore, in the ROM 3, the address is specified by the upper address UA consisting of the upper 31 bits of the address A output from the main processor 1. The upper address UA excluding the least significant bit A0 of the address A is obtained by shifting the address A to the right by one bit. More specifically, the upper address UA is obtained by integer dividing the address A by 2 (that is, rounding down to the nearest whole number). In accordance with the value of the least significant bit A0, the upper address UA may be calculated by Expression 1 below.

[Expression 1]

$$UA \leftarrow \frac{A}{2}$$

where $A_0 = 0$ $$UA \leftarrow \frac{A-1}{2}$$

where $A_0 = 1$

The multiplexer 2e transmits the pseudoinstruction word held in either the upper register 2c or the lower register 2d to the converting circuit 2b in accordance with the lower bit A0 of the address A output from the main processor 1. The address separation register 2f does not need to hold the address. In this case, the address separation register 2f may be coupled to the multiplexer 2e. In the same manner as the upper address A1 to A31 of the address A is transmitted to the ROM 3, the least significant address A0 is transmitted to the multiplexer 2e.

A reading operation of the main processor 1 in the computer device of Example 2 will be described with reference to FIG. 9.

FIG. 9 shows the procedure of a process for reading the instruction stored in the ROM 3.

At STEP S1, the main processor 1 outputs the address A consisting of 32 bits from the address register 1la to the address separation register 2f.

At STEP S2, the address separation register 2f outputs the 31-bit upper address UA via the address bus 4 to the ROM 3. The ROM 3 outputs two pseudoinstruction words to the data bus 5 based on the upper address UA. The address separation register 2f outputs the least significant bit A0 of the address A to the multiplexer 2e.

At STEP S3, the two pseudoinstruction words on the data bus 5 are separated from each other. One pseudoinstruction word is held in the upper register 2c, and the other is held in the lower register 2d.

At STEP S4, the multiplexer 2e determines whether the least significant bit A0 of the address A is 0 or not. In the case where the least significant bit A0 is 0, the process proceeds to STEP S5. In the case where the least significant bit A0 is not 0, the process proceeds to STEP S6.

At STEP S5, the multiplexer 2e selects the pseudoinstruction word held in the upper register 2c, and outputs the selected pseudoinstruction word to the converting circuit 2b.

At STEP S56, the multiplexer 2e selects the pseudoinstruction word held in the lower register 2d, and outputs the selected pseudoinstruction word to the converting circuit 2b.

At STEP S7, the converting circuit 2b converts the 16-bit pseudoinstruction word output from the multiplexer 2e into a 32-bit instruction word.

At STEP S8, the main processor 1 reads the converted instruction word.

However, for example, in the case where an instruction word corresponding to an address B is read out subsequent to the instruction word corresponding to the address A, when a difference between the address A and the address B is only in the least significant bit A0, the following reading process is performed.

The main processor 1 outputs the 32-bit address B from the address register 1a to the address separation register 2f.

The address separation register 2f notifies the multiplexer 2e via a data bus (not shown) that the upper address UA of the address B is the same as the upper address UA of the address A. The address separation register 2f outputs a least significant bit B0 of the address B to the multiplexer 2e.

The multiplexer 2e selects either the pseudoinstruction word held in the upper register 2c or the pseudoinstruction word held in the lower register 2d based on the least significant bit B0 of the address B, and then outputs the selected pseudoinstruction word to the converting circuit 2b.

Therefore, in the case where the address B, which differs from the address A only in the least significant bit, is output, either the pseudoinstruction word held in the upper register 2c or the pseudoinstruction word held in the lower register 2d is converted into an instruction word to be transmitted to the main processor 1 without performing a reading operation of the ROM 3. Thus, the main processor 1 can read a new instruction word without a delay for accessing the ROM 3.

As described above, according to the computer device of Example 2, the number of bits of the pseudoinstruction word is defined as 16, thereby halving a memory capacity of the ROM 3. In this manner, if the number of bits of the pseudoinstruction word can be defined as 8 bits, for example, the memory capacity can be reduced to ¼. Like Example 1, the main processor 1 having the same configuration as that of the conventional microprocessor shown in FIG. 10 can also be utilized in Example 2.

In Example 2, the number of bits of memory 3 is increased or the number of bits of the pseudoinstruction word is reduced, so that two or more pseudoinstruction words can be simultaneously read out by a single reading operation. Therefore, the main processor 1 can reduce a delay required for a reading operation of the ROM 3 half or less.

Moreover, as the pseudoinstruction word is effectively read out from the ROM 3, a bus cycle of the address bus 4 and the data bus 5 can be reduced. An operational frequency F (bus cycle) and a power consumption P in an LSI circuit generally have the proportional relationship expressed by Expression 2 below, where Z is a predetermined value.

[Expression 2]

$$P\ ZF$$

More specifically, when the operational frequency F is reduced to ½, a switching speed in the microprocessor 11 or a three-status buffer of the ROM 3 is also reduced to ½. Accordingly, the power consumption P is reduced to about ½.

Thus, by reducing the bus cycle of the computer device of Example 2, the power consumption P of the computer device of Example 2 can be reduced. In addition, by reducing the number of bits of the address bus 4 to 31, a three-status buffer connected to the address bus 4 or the like can be omitted. As a result, the power consumption required for the three-status buffer connected to the address bus 4 or the like is eliminated.

Examples 1 and 2 are described neglecting the cache memory 1$g$. In the case where the cache memory 1$g$ is used, the cache memory 1$g$ is located between the instruction word converter 2 and the main processor 1 or between the instruction word converter 2 and the data bus 5.

In addition, Examples 1 and 2 describe only the case where the converting circuit 2$b$ utilizes a kind of conversion table. If the pseudocode stored in the ROM 3 is too large to sufficiently reduce the number of bits of the pseudoinstruction word, the pseudocode may be divided into a plurality of blocks in accordance with the address, so that different conversion tables are used for the respective blocks. In such a case, switching between the conversion tables can be performed by decoding the address output from the main processor 1.

In Examples 1 and 2 described above, only the ROM 3 is described as a main memory device. In the actual computer device, a RAM is also connected to the address bus 4 or the data bus 5. If all instruction words which have a possibility of being stored in the RAM are previously known, the pseudocodes of the pseudoinstruction word can be stored in the RAM so as to reduce a memory capacity as described above. For example, the pseudocode may be directly transmitted from a hard disk device to the RAM by direct memory access (DMA) or the like.

However, in the case where the data held in the internal register group 1$b$ in the main processor 1 is written into the RAM, the held data is required to be first converted into a pseudoinstruction word to be output to the data bus 5.

In general, it is difficult to predict all the data written in the RAM during execution of a program. For example, if an application program programmed with C language is loaded into the RAM, a code area in which the stored contents remain unchanged and a data area for storing a static variable and constant data are principally preserved on the RAM until the completion of the program. When the program is executed, the contents stored in the data area change every time the static variable is updated. Moreover, a static area and a heap area are preserved on the RAM. Every time a local variable of the program or the like is updated or a function call occurs, the contents stored in these areas change. Thus, all of the object codes executed in the ALU 1$e$ cannot always be predicted.

In the case where all the object codes cannot be predicted, the instruction word converter 2 converts only the pseudoinstruction word read out from the ROM 3. The data read out from the RAM or the like may be output to the main processor 1 without conversion. At this time, whether or not the instruction word converter 2 should perform conversion can be determined by decoding the address output from the main processor 1. According to the computer device of the present invention, an I/O port can be connected to the address bus 4 and the data bus 5 so as to input/output to a peripheral device such as a display device and an input device. The I/O port can also be used as in the case of the RAM described above.

With the above configuration, the same number of pseudocodes as that of the object codes are stored in a memory. In the present invention, a word length of the pseudoinstruction word is shorter than that of each of the instruction words of the object code. Therefore, in the computer device according to the present invention, a memory capacity can be reduced. This memory requires the same address space as that of the case where the object code containing the original instruction words is stored. However, since the number of bits of one word of each address can be reduced, a memory capacity can be reduced in this memory.

Assuming each of the instruction words of the object code consists of p bits, there are $2^p$ kinds of instruction words at maximum. For example, it is assumed that there are Q kinds of instruction words actually used in a specific object code. In this case, q (q is an integer equal to or larger than 1) is defined as the number of bits of each of the instruction words, when $2^q$ becomes minimum at Q or larger. In the computer device of the present invention, each of the $2^q$ or less kinds of pseudoinstruction words can be associated with each of Q kinds of instruction words used within the object code.

If the number of words of this specific object code is less than $2^p$, Q is always less than $2^p$. Furthermore, since the same instruction word is used twice or more within the object code, Q is further reduced. Therefore, normally, Q (kinds) is sufficiently smaller than $2^p$ (kinds).

In the computer device of the present invention, since $2^q$ is sufficiently smaller than $2^p$, the number q of bits of the pseudoinstruction word is smaller than the number p of bits of the original instruction word. Therefore, a memory capacity can be reduced by a difference between the numbers of bits (i.e., p−q).

If the number of kinds of the object code to be used is enormous, there is almost no difference between the number p of bits and the number q of bits. The number p of bits and the number q of bits may become identical with each other in some cases. As a result, there arises a possibility of failing to reduce the memory capacity. Thus, in the case where the number of kinds of the object code is large, the object code used in the computer device of the present invention is divided into a plurality of blocks. If each pseudoinstruction word is associated with each instruction word independently for each block, it is ensured that the memory capacity is reduced. In this case, the instruction word converter of the computer device of the present invention requires the performance of a different conversion process for each block.

A certain pseudoinstruction word is not always required to be stored only in a memory area of a corresponding address, but can be stored in a plurality of consecutive addresses. For example, in the computer device of the present invention, pseudoinstruction words each consisting of 16 bits, 32 bits, or 64 bits may be stored in a memory of a byte address (i.e., a memory area for one address is of 8 bits). Normally, the number of bits of one word is identical with that of the data bus, and can therefore be read out by a single memory access.

In the case where the computer device of the present invention includes, in addition to the memory storing the pseudoinstruction words, an area for a main memory device storing an original instruction word or normal data, the instruction word or the data read out from the area for the main memory device is required to read in the processor without performing conversion in the instruction word converter. In this case, whether the instruction word converter is used or not is determined based on the address specified by the processor. The same operation is performed in the case where the computer device of the present invention includes the I/O port for inputting normal data.

Since the same number of pseudocodes as that of the object codes are stored in the memory, the memory capacity can be reduced. In this case, each of the pseudocodes contains pseudoinstruction words, each consisting of bits less than those of each of the instruction words of the object code. Since a plurality of pseudoinstruction words are stored in each address in this case, the number of bits of each address is not always reduced. However, the pseudoinstruction word is read out based on the address excluding i bits from the address specified by the processor. Thus, the address space is reduced by i bits. As a result, a small capacity of the memory is sufficient for the computer device of the present invention.

A plurality of pseudoinstruction words are simultaneously read out, and are then temporarily stored in the instruction word converter. The processor can successively read the remaining $2^i-1$ words at high speed by changing only the address of i bits which are excluded in the memory. For in the case where the number p of bits contained in the original instruction word is twice the number q of bits contained in the pseudoinstruction word, and two pseudoinstruction words are read out at the same time from the memory (i.e., i=1), the instruction words can be read in the processor at about double speed.

In the computer device of the present invention, after converting the pseudoinstruction word into the instruction word in its original form, the instruction word converter holds the instruction word. In such a case, the number of bits of the register holding the instruction word is increased. However, overhead which occurs due to a conversion process upon reading the remaining instruction words in the processor is eliminated.

Furthermore, according to the computer device of the present invention, the processor and the instruction converter may be integrally formed when a microprocessor is formed as one chip large scale integrated (LSI) circuit.

Furthermore, according to the computer device of the present invention, since the instruction word converter converts the instruction words by using the conversion table, the correspondence between the pseudoinstruction word and its original instruction word can be more easily changed as compared with the case where conversion is performed by using a normal logic circuit or the like.

In addition, according to the computer device of the present invention, the conversion table may be constituted by a ROM. In the case where an object code to be processed by the processor is previously determined, it is convenient to provide the conversion table in the ROM. The ROM includes an overwritable ROM such as an EEPROM.

Moreover, according to the computer device of the present invention, the conversion table may be constituted by a RAM. If the object code processed by the processor is changed as desired, it is convenient to use the RAM in such a manner that the conversion table can be overwritten.

As described above, according to the computer device of the present invention, since the pseudoinstruction word containing bits less than those of the original instruction word is stored in the memory, the memory capacity can be reduced. As a result, the memory capacity of the main memory device can be reduced. Thus, equipment using this computer device can be reduced in size and cost.

Furthermore, since a plurality of pseudoinstruction words are simultaneously read out, the instruction words can be read at high speed in the same bus cycle. Therefore, even when the processor is operated at high speed, the memory is not bottlenecked.

In addition, by reducing the bus cycle, the power consumption can be reduced. Furthermore, by reducing the number of bits of the address bus 4 to 31, a three-status buffer connected to the address bus 4 or the like can be omitted. As a result, the power consumption of the three-status buffer connected to the address bus 4 or the like is reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A computer device comprising:
   a processor for processing an object code containing a plurality of instruction words;
   a memory for storing a plurality of pseudoinstruction words respectively corresponding to the plurality of instruction words, the number of bits of each of the plurality of pseudoinstruction words being less than that of each of the plurality of instruction words; and
   an instruction word converter for converting the pseudoinstruction word read out from the memory into an instruction word of the object code and for outputting the instruction word obtained by the conversion to the processor,
   the number of bits of the pseudoinstruction words being variable and dependent upon a number of required instruction words.

2. The computer device according to claim 1, the processor and the instruction word converter are formed on one chip.

3. The computer device according to claim 1, wherein the instruction word converter includes a conversion table representing a correspondence between the pseudoinstruction words and the instruction words of the object code, wherein the conversion table in used to convert the pseudoinstruction words into the instruction words of the object code.

4. The computer device according to claim 3, wherein the conversion table is implemented in a ROM, and when an address corresponding to a pseudoinstruction word is input to the ROM, and instruction word in the object code corresponding to the input address is output from the ROM.

5. The computer device according to claim 3, wherein the conversion table is implemented in a RAM, and when an address corresponding to a pseudoinstruction word is input to the RAM, an instruction word in the object code corresponding to the input address is output from the RAM, an wherein the computer device further includes an overwriting circuit for overwriting the conversion table.

6. A computer device comprising:

a processor for processing an object code containing a plurality of instruction words;

a memory for storing a plurality of pseudoinstruction words in units of $2^i$ words, the plurality of pseudoinstruction words respectively corresponding to the plurality of instruction words, the number of bits of each of the plurality of pseudoinstruction words being less than that of each of the plurality of instruction words; and an instruction word converter for converting the pseudoinstruction word read out from the memory into an instruction word of the object code and for outputting the instruction word obtained by the conversion to the processor, wherein the processor outputs an address of q bits, q being an integer, to the instruction word converter, the instruction word converter separates the address of n bits into an address of n-i bits and an address of i bits, the memory outputs the $2^i$ pseudoinstruction words stored in pairs, corresponding to the address of n-i bits, the instruction word converter selects one pseudoinstruction word from the $2^i$ pseudoinstruction words in accordance with the address of i bits, the processor processes the selected pseudoinstruction word, and i and n are respectively integers equal to or larger than 1, and satisfy a conditional expression n>i, the number of bits of the pseudoinstruction words being variable and dependent upon a number of required instruction words.

7. The computer device according to claim 6, wherein the processor and the instruction word converter are formed on one chip.

8. The computer device according to claim 6, wherein the instruction word converter includes a conversion table representing a correspondence between the pseudoinstruction words and the instruction words of the object code, wherein the conversion table is used to convert the pseudoinstruction words into the instruction words of the object code.

9. The computer device according to claim 8, wherein the conversion table is implemented in a ROM, and when an address corresponding to a pseudoinstruction word is input to the ROM, an instruction word in the object code corresponding to the input address is output from the ROM.

10. The computer device according to claim 8, wherein the conversion table is implemented in a RAM, and when an address corresponding to a pseudoinstruction word is input to the RAM, an instruction word in the object code corresponding to the input address is output from the RAM, and wherein the computer device further includes overwriting means for overwriting the conversion table.

11. The computer device of claim 4, wherein the ROM is an EEPROM.

12. The computer device of claim 9, wherein the ROM is an EEPROM.

13. The computer device of claim 4, wherein the ROM stores pairs of pseudoinstruction words.

14. The computer device of claim 9, wherein the ROM stores pairs of pseudoinstruction words.

15. A computer device comprising:

a processor for processing an object code containing a plurality of instruction words;

a memory for storing a plurality of pseudoinstruction words respectively corresponding to the plurality of instruction words, the number of bits of each of the plurality of pseudoinstruction words being less than that of each of the plurality of instruction words; and an instruction word converter for converting the pseudoinstruction word read out from the memory into an instruction word of the object code and for outputting the instruction word obtained by the conversion to the processor, the instruction word converter comprising a first register and a second register, each receiving a pseudoinstruction word from the memory, a first selecting circuit for selecting one of the first and second registers, and a converting circuit for converting a pseudoinstruction word output from the selected one of the first and second registers into an instruction word.

16. The computer device of claim 15, wherein the selecting circuit selects one of the first and second registers based on a predetermined portion of the pseudoinstruction word received from the first and second registers.

17. A computer device comprising:

a processor for processing an object code containing a plurality of instruction words;

a memory for storing a plurality of pseudoinstruction words in units of $2^i$ words, the plurality of pseudoinstruction words respectively corresponding to the plurality of instruction words, the number of bits of each of the plurality of pseudoinstruction words being less than that of each of the plurality of instruction words; and an instruction word converter for converting the pseudoinstruction word read out from the memory into an instruction word of the object code and for outputting the instruction word obtained by the conversion to the processor, wherein the processor outputs an address of q bits, q being an integer, to the instruction word converter, the instruction word converter separates the address of n bits into an address of n-i bits and an address of i bits, the memory outputs the $2^i$ pseudoinstruction words stored in pairs, corresponding to the address of n-i bits, the instruction word converter selects one pseudoinstruction word from the $2^i$ pseudoinstruction words in accordance with the address of i bits, the processor processes the selected pseudoinstruction word, and i and n are respectively integers equal to or larger than 1, and satisfy a conditional expression n>i, the instruction word converter comprising a first register and a second register, each receiving a pseudoinstruction word from the memory, a first selecting circuit for selecting one of the first and second registers, and a converting circuit for converting a pseudoinstruction word output from the selected one of the first and second registers into an instruction word.

18. The computer device of claim 17, wherein the selecting circuit selects one of the first and second registers based on a predetermined portion of the pseudoinstruction word received from the first and second registers.

19. A method for processing data utilizing pseudoinstruction words, comprising the steps of:

storing a plurality of pseudoinstruction words corresponding to a plurality of instruction words;

receiving an input instruction;

temporarily storing a plurality of pseudoinstruction words in a temporary storage area based upon the received input instruction;

selecting one of the temporarily stored pseudoinstruction words based upon a portion of the received input instruction; and converting the selected pseudoinstruction word into an instruction word the pseudoinstruction words having of a bit length no more than half of a bit length of the instruction words.

20. A method for processing data utilizing pseudoinstruction words, comprising the steps of:

storing a plurality of pseudoinstruction words corresponding to a plurality of instruction words;

receiving an input instruction:

temporarily storing a plurality of pseudoinstruction words in a temporary storage area based upon the received input instruction;

selecting one of the temporarily stored pseudoinstruction words based upon a portion of the received input instruction; and converting the selected pseudoinstruction word into an instruction word, one of the temporarily stored pseudoinstruction words being selected based on a least significant bit of the received input instruction.

21. A method for processing data utilizing pseudoinstruction words, comprising the steps of:

storing a plurality of pseudoinstruction words corresponding to a plurality of instruction words;

receiving an input instruction;

temporarily storing a plurality of pseudoinstruction words in a temnporary storage area based upon the received input instruction;

selecting one of the temporarily stored pseudoinstruction words based upon a portion of the received input instruction; and converting the selected pseudoinstruction word into an instruction word, the selected pseudoinstruction word having a first bit length n, n being an integer, and being converted into an instruction word of a second bit length 2n.

22. A method for processing data utilizing pseudoinstruction words, comprising the steps of:

storing a plurality of pseudoinstruction words corresponding to a plurality of instruction words;

receiving an input instruction;

temporarily storing a plurality of pseudoinstruction words in a temporary storage area based upon the received input instruction;

selecting one of the temporarily stored pseudoinstruction words based upon a portion of the received input instruction; and converting the selected pseudoinstruction word into an instruction word, the method further comprising the step of processing the instruction word, obtained by converting the selected pseudoinstruction word, as one of a plurality of instruction words of an object code.

* * * * *